United States Patent
Chen et al.

(10) Patent No.: US 10,274,719 B2
(45) Date of Patent: Apr. 30, 2019

(54) OPTICAL SYSTEM

(71) Applicant: LIQXTAL TECHNOLOGY INC., Tainan (TW)

(72) Inventors: Hung-Shan Chen, Tainan (TW); Jui-Ping Chang, Tainan (TW)

(73) Assignee: LIQXTAL TECHNOLOGY INC., Tainan (TW)

( * ) Notice: Subject to any disclaimer, the term of this patent is extended or adjusted under 35 U.S.C. 154(b) by 115 days.

(21) Appl. No.: 15/682,521

(22) Filed: Aug. 21, 2017

(65) Prior Publication Data

US 2019/0056585 A1    Feb. 21, 2019

(51) Int. Cl.

| G02B 26/00 | (2006.01) |
| G02B 3/12  | (2006.01) |
| G02B 1/00  | (2006.01) |
| G02B 1/02  | (2006.01) |
| G02B 1/06  | (2006.01) |
| G02B 15/00 | (2006.01) |

(52) U.S. Cl.
CPC ........... *G02B 26/004* (2013.01); *G02B 1/002* (2013.01); *G02B 1/02* (2013.01); *G02B 1/06* (2013.01); *G02B 3/12* (2013.01); *G02B 15/00* (2013.01)

(58) Field of Classification Search
CPC ........ G02B 26/004; G02B 1/002; G02B 1/02; G02B 1/06; G02B 3/12; G02B 15/00
USPC ........................................................ 359/579
See application file for complete search history.

(56) References Cited

U.S. PATENT DOCUMENTS

| 2012/0300167 A1 | 11/2012 | You et al. |
| 2016/0363742 A1* | 12/2016 | Ohno ................... G02B 27/646 |

FOREIGN PATENT DOCUMENTS

| CN | 102749715 | 10/2012 |
| CN | 105408815 | 3/2016 |
| CN | 106338830 | 1/2017 |
| TW | 201213879 | 4/2012 |
| TW | 201400881 | 1/2014 |
| TW | 201432347 | 8/2014 |

(Continued)

OTHER PUBLICATIONS

Yi-Pai Huang, et al., "Superzone Fresnel Liquid Crystal Lens for Temporal Scanning Auto-Stereoscopic Display," Journal of Display Technology, vol. 8, No. 11, Nov. 2012, pp. 650-655.

(Continued)

*Primary Examiner* — Wen Huang
(74) *Attorney, Agent, or Firm* — JCIPRNET (57) ABSTRACT

An optical system including at least one liquid crystal lens and an imaging lens module is provided. The optical system is configured to form an image of an object. The at least one liquid crystal lens and the imaging lens module is disposed on a path of light from the object. The at least one liquid crystal lens includes a first substrate, a second substrate, and a liquid crystal layer. The second substrate is opposite to the first substrate. The liquid crystal layer is disposed between the first substrate and the second substrate. An effective refractive index of each position on the liquid crystal layer is related to an voltage applied, and the at least one liquid crystal lens is configured to change an optical axis of the at least one liquid crystal lens by changing distribution of orientations of liquid crystal molecules of the liquid crystal layer.

20 Claims, 12 Drawing Sheets

(56) References Cited

FOREIGN PATENT DOCUMENTS

TW         201533473       9/2015
TW         201728938       8/2017

OTHER PUBLICATIONS

T.Martinez, et al., "Foveated, wide field-of-view imaging system using a liquid crystal spatial light modulator," Optics Express, vol. 8, No. 10, May 7, 2001, pp. 555-560.
"Office Action of Taiwan Counterpart Application," dated Feb. 9, 2018, p. 1-p. 11.

\* cited by examiner

OPTICAL SYSTEM

BACKGROUND OF THE INVENTION

1. Field of the Invention

The invention relates to an optical system.

2. Description of Related Art

In recent years, along with the rise of augmented reality (AR) and virtual reality (VR), the quality of an image seen by eyes of a user is required to be higher. In optical imaging systems, the further an object is distant from an optical axis center, the more obvious aberration of an image formed on an image plane becomes. The viewing angle of human eyes is about 60 degrees. However, in order to improve the problem of aberration at wide viewing angle, more optical lenses are added to correct aberration, which will increase cost and weight of a product.

Besides, a biggest problem of a head mounted display (HMD) is that distance of a virtual image from the eyes of the user couldn't be changed. In order to change the distance of the virtual image, the imaging system needs to have a zoom function, such as adding a motor in the system to adjust spacing of lenses. As a result, it will greatly increase weight, size, power consumption, and noise of the product.

SUMMARY OF THE INVENTION

The invention provides an optical system capable of effectively reducing aberration or achieving a zoom function.

According to an embodiment of the invention, an optical system including at least one liquid crystal lens and an imaging lens module is provided. The optical system is configured to form an image of an object. The at least one liquid crystal lens is disposed on a path of light from the object. The imaging lens module is disposed on the path of light from the object. The at least one liquid crystal lens includes a first substrate, a second substrate, and a liquid crystal layer. The second substrate is opposite to the first substrate. The liquid crystal layer is disposed between the first substrate and the second substrate, wherein an effective refractive index of each position on the liquid crystal layer is related to an voltage applied, and the at least one liquid crystal lens is configured to change an optical axis of the at least one liquid crystal lens by changing distribution of orientations of liquid crystal molecules of the liquid crystal layer. The imaging lens module includes a plurality of lenses, wherein the at least one liquid crystal lens and the imaging lens module form the image of the object.

Based on the above, the optical system provided by one of the embodiments of the invention includes at least one liquid crystal lens. The liquid crystal lens is driven by the voltage to change the distribution of orientations of the liquid crystal molecules, so as to make the effective refractive index of each position on the liquid crystal layer change and the optical axis of the liquid crystal lens shift away from a geometric axis of the liquid crystal lens. Therefore, the optical path difference of the image at wide viewing angle can be compensated, so as to reduce aberration. The quality of the image is improved. In addition, by controlling the distribution of orientations of the liquid crystal molecules, refractive power of the liquid crystal lens can be tunable, so as to achieve a zoom function.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 1:
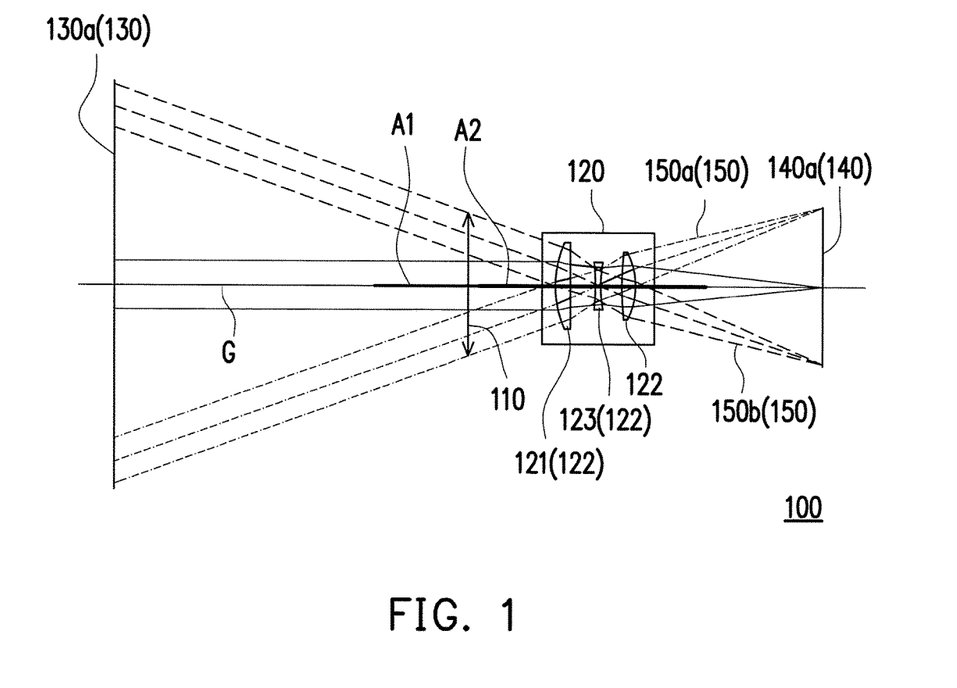
FIG. 1 is a schematic side view of an optical system 100 according to an embodiment of the invention.
Figure 2:
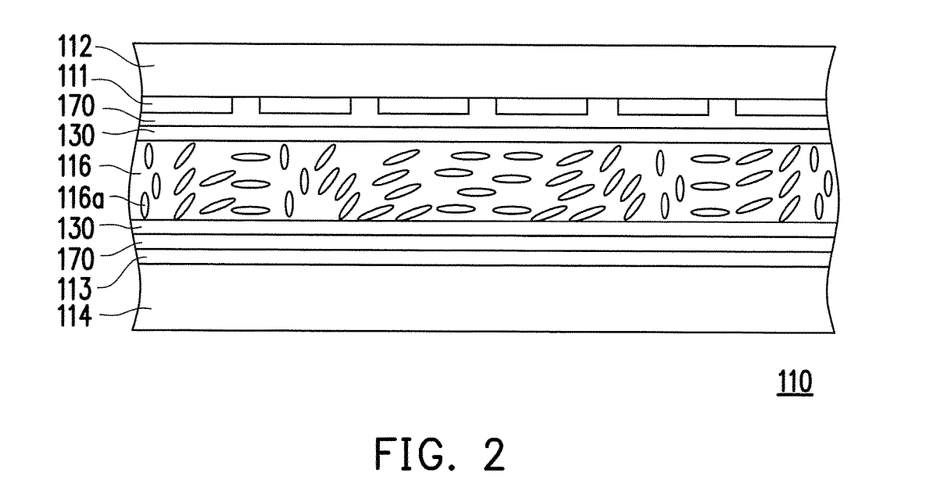
FIG. 2 is a schematic cross-sectional view of a liquid crystal lens 110 of the embodiment depicted in FIG. 1.

FIG. 1 is a schematic side view of an optical system 100 according to an embodiment of the invention. FIG. 2 is a schematic cross-sectional view of a liquid crystal lens 110 of the embodiment depicted in FIG. 1. Referring to FIG. 1 and FIG. 2, an optical system 100 of the present embodiment includes at least one liquid crystal lens 110 and a imaging lens module 120 (for example, FIG. 1 illustrates one liquid crystal lens 110). The optical system 100 is configured to form an image 130a of an object 140a. The at least one liquid crystal lens 110 and the imaging lens module 120 are disposed on a path of light 150 from the object 140a. The at least one liquid crystal lens 110 includes a first substrate 112, a second substrate 114, and a liquid crystal layer 116. The second substrate 114 is opposite to the first substrate 112. The liquid crystal layer 116 is disposed between the first substrate 112 and the second substrate 114. An effective refractive index of each position on the liquid crystal layer 116 is related to an voltage applied on a first electrode 111 and a second electrode 113, and the at least one liquid crystal lens 110 is configured to change an optical axis A1 of the at least one liquid crystal lens 110 by changing distribution of orientations of liquid crystal molecules 116a of the liquid crystal layer 116. The imaging lens module 120 includes a plurality of lenses 122, wherein the at least one liquid crystal lens 110 and the imaging lens module 120 form the image 130a of the object 140a.

In the present embodiment, an optical axis A2 of the imaging lens module 120 is parallel to the optical axis A1 of the at least one liquid crystal lens 110, and the plurality of lenses 122 of the imaging lens module 120 include a converging lens 121 having positive refractive power and a diverging lens 123 having negative refractive power.

In the present embodiment, the object 140a is a light valve, and the light valve is, for example, a liquid-crystal-on-silicon (LCOS) panel, a digital micro-mirror device (DMD), or a transmissive liquid crystal display (LCD). A light source may emit light to the light valve so as to illuminate the light valve. When the light valve is a LCOS panel, a polarizing beam splitter (PBS) may be disposed between the light valve and the liquid crystal lens 110. When the light valve is a DMD, two liquid crystal lenses 110 respectively having two perpendicular rotation directions of liquid crystal molecules 116a may be disposed on the light path of the light 150. In other embodiment, the object 140a may be an organic light-emitting diode display, a light-emitting diode display, or any other light spatial modulator or display.

Figure 3A:
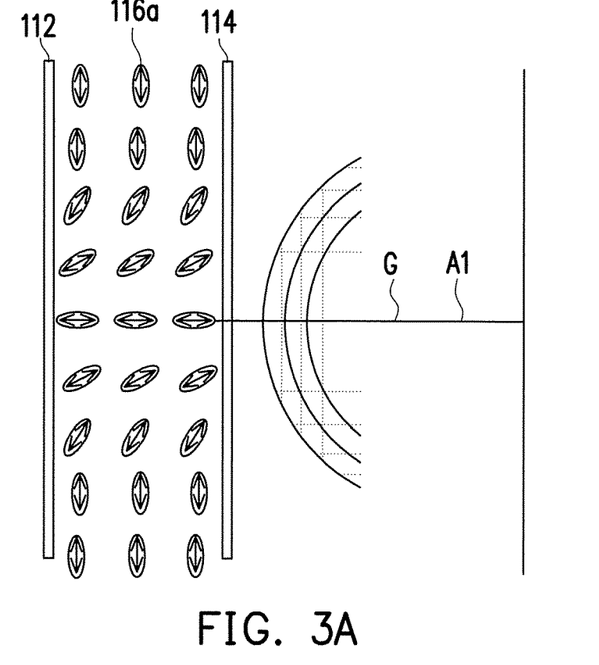
FIG. 3A and FIG. 3B are schematic cross-sectional views of a liquid crystal lens 110 according to embodiments of the invention
Figure 3B:
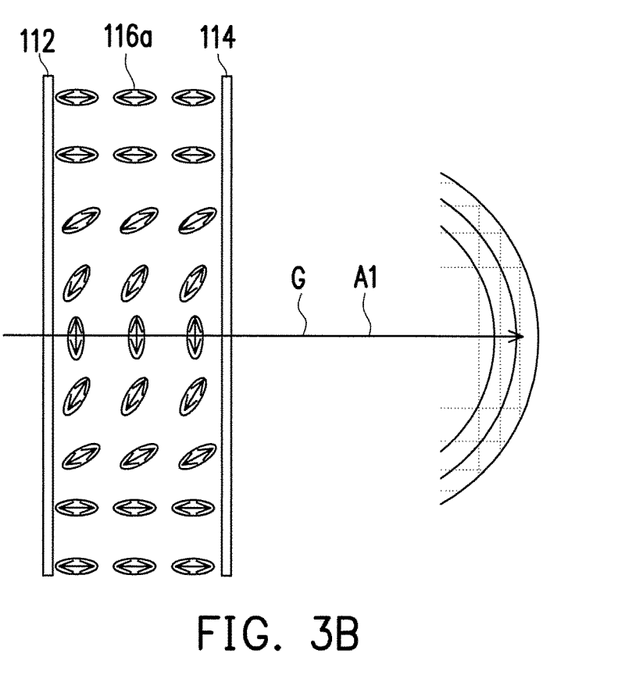

FIG. 3A and FIG. 3B are schematic cross-sectional views of a liquid crystal lens 110 according to embodiments of the invention. In FIG. 3A and FIG. 3B, for clear description, only the first substrate 112, the second substrate 114, and the liquid crystal molecules 116a of the liquid crystal layer 116 are illustrated, wherein arrows represent orientations of liquid crystal molecules 116a. Referring to FIG. 3A and FIG. 3B, the liquid crystal lens 110 is driven by the voltage to change the distribution of orientations of the liquid crystal molecules 116a, wherein the effective refractive index of each position on the liquid crystal layer 116 is related to the voltage applied. Specially, optical path length (OPL) of a light 150 (OPL is effective refractive index multiplied by the thickness T of the liquid crystal layer 116) passing through the liquid crystal layer 116 at each position on the liquid crystal layer 116 can be controlled by the voltage applied. As a plane wave passes through the liquid crystal lens 110 driven by the voltage, a converging spherical wave with a positive refractive power (as illustrated in FIG. 3A) or a diverging spherical wave with negative refractive power (as illustrated in FIG. 3B) can be formed. Therefore, refractive power of the liquid crystal lens 110 can be tunable, so as to achieve zoom function.

Figure 3C:
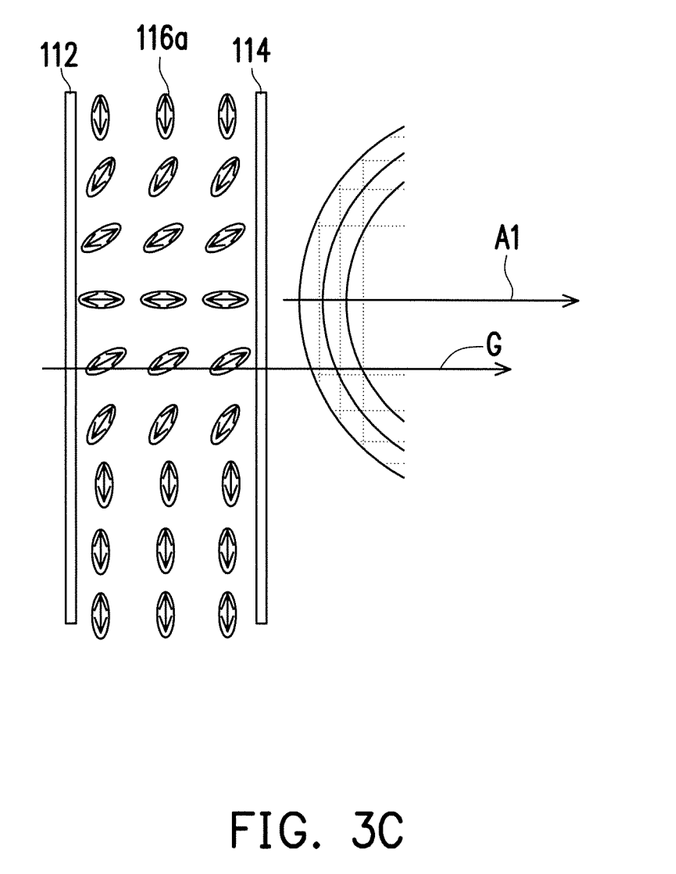
FIG. 3C is schematic cross-sectional view of a liquid crystal lens 110 according to another embodiment of the invention.

FIG. 3C is schematic cross-sectional view of a liquid crystal lens 110 according to another embodiment of the invention. In FIG. 3C, for clear description, only the first substrate 112, the second substrate 114, and the liquid crystal molecules 116a of the liquid crystal layer 116 are illustrated, wherein arrows represent orientations of liquid crystal molecules 116a. Referring to FIG. 3C, by controlling the voltage to change the distribution of orientations of the liquid crystal molecules 116a, the optical axis A1 of the liquid crystal lens 110 shifts away from a geometric axis G of the liquid crystal lens 110. As a result, OPL of the image 130a at wide viewing angle can be compensated, so as to reduce aberration. The quality of the image is improved. The optical axis A1 of the liquid crystal lens 110 is defined as the optical axis of the liquid crystal layer 116 when the liquid crystal layer 116 has a function of a lens. When the distribution of the orientations of liquid crystal molecules 116a shifts up, the optical axis A1 of the liquid crystal lens 110 shifts up, so that the optical axis A1 of the liquid crystal lens 110 shifts away from the geometric axis G of the liquid crystal lens 110. The geometric axis G of the liquid crystal lens 110 means the central axis of the liquid crystal lens 110 which passes through the center of the liquid crystal lens 110.

Figure 4:
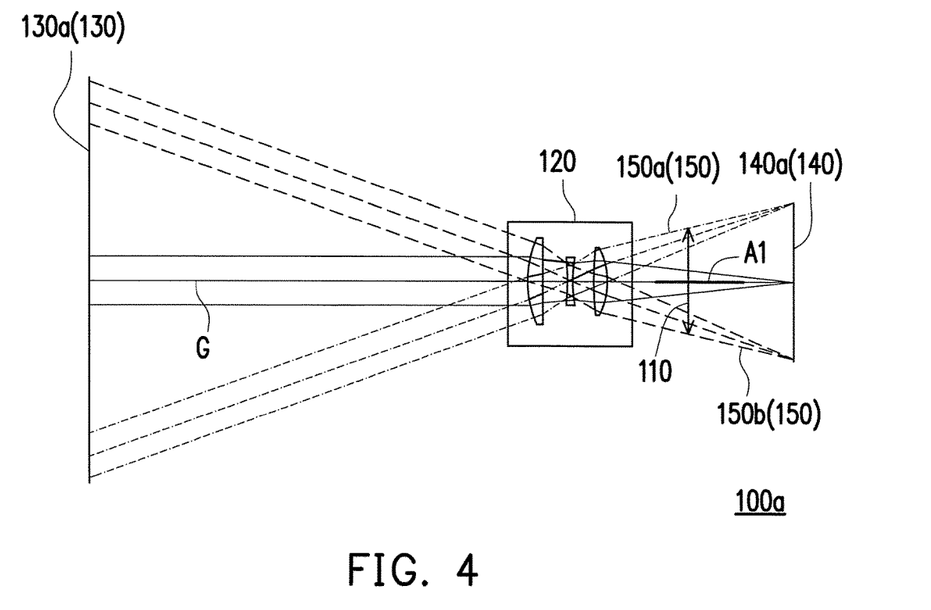
FIG. 4 is a schematic side view of an optical system 100a according to another embodiment of the invention.

FIG. 4 is a schematic side view of an optical system 100a according to another embodiment of the invention. Referring to FIG. 1 and FIG. 4, the object 140a is on an object plane 140, and the image 130a is on an image plane 130. In the present embodiments, the image 130a is a real image. The image plane 130 and the object plane 140 are mutually conjugate planes, and imaging rays emitted from a same point on the object plane 140 are all converged to a same point on the image plane 130. Besides, the liquid crystal lens 110 can be disposed between the image plane 130 and the imaging lens module 120 (as illustrated in FIG. 1), or between the object plane 140 and the imaging lens module 120 (as illustrated in FIG. 4).

Figure 5:
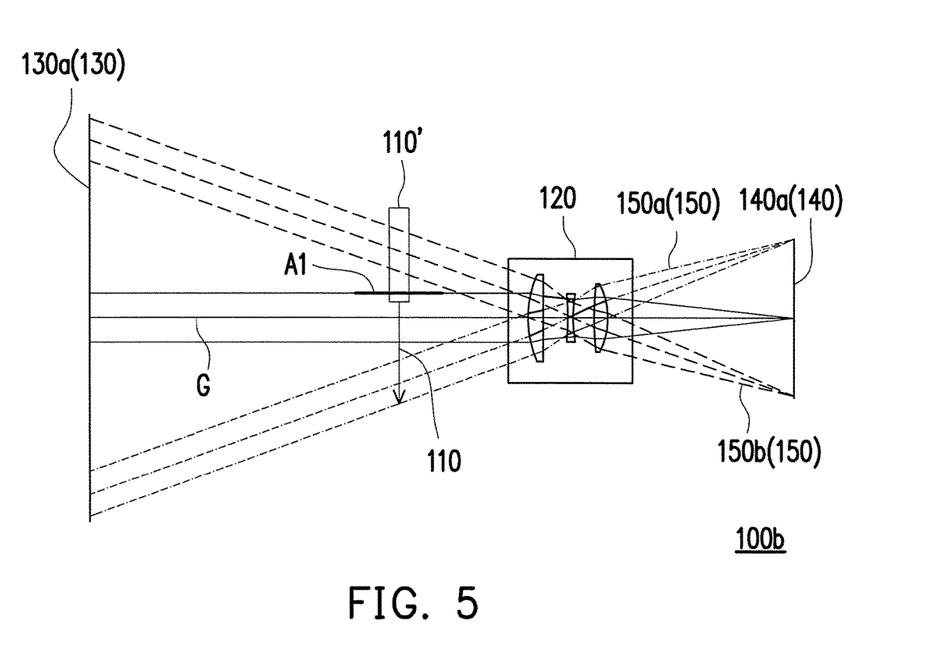
FIG. 5 is a schematic side view of an optical system 100b according to another embodiment of the invention.

FIG. 5 is a schematic side view of an optical system 100b according to another embodiment of the invention. Referring to FIG. 5, by controlling the voltage to change the distribution of orientations of the liquid crystal molecules 116a, the optical axis A1 of the liquid crystal lens 110 shifts to an upper side of the liquid crystal lens 110. As a result, the OPL of an imaging light beam 150b of a lower portion of the object 140a can be compensated, so as to reduce aberration. In other embodiments, the optical axis A1 of the liquid crystal lens 110 can shift to a lower side of the liquid crystal lens 110 to compensate the OPL of an imaging light beam 150a of an upper portion of the object 140a, and the invention is not limited thereto. Therefore, aberration can be reduced by a shift of the optical axis A1 of the liquid crystal lens 110. The quality of the image is improved.

Figure 6:
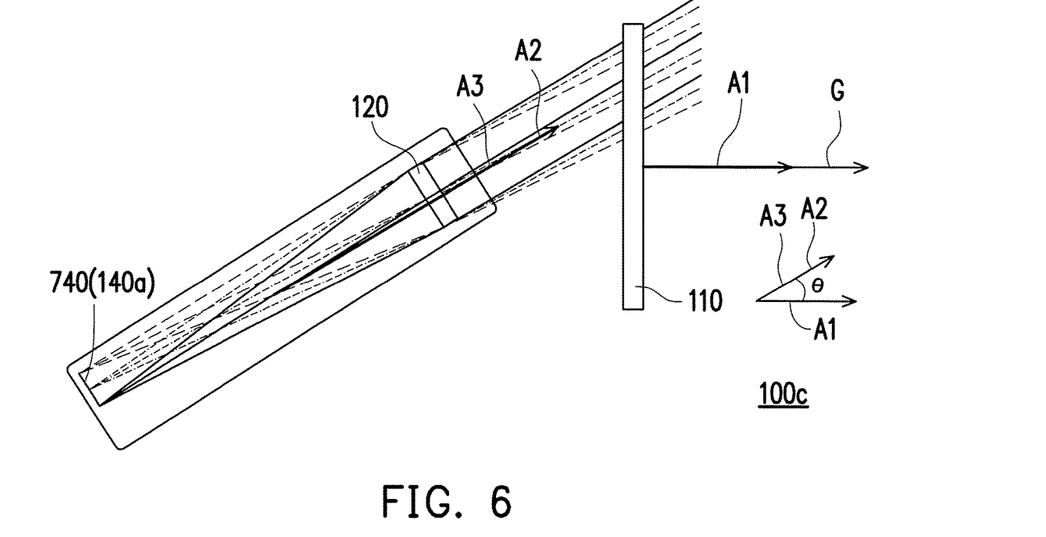
FIG. 6 is a schematic cross-sectional view of an optical system 100c according to an embodiment of the invention.

FIG. 6 is a schematic cross-sectional view of an optical system 100c according to an embodiment of the invention. Referring to FIG. 6, the optical system 100c further includes a light valve 740, wherein the light valve 740 is the object 140a, and the light valve 740 is formed by micro-structure pixel array. Besides, an optical axis A3 of the light valve 740 and the optical axis A2 of the imaging lens module 120 have an inclined angle θ with respect to the geometric axis G of the liquid crystal lens 110, wherein the inclined angle θ is greater than 0 degree and is less than or equal to 60 degrees. In the present embodiment, the light valve 740 is, for example, a liquid-crystal-on-silicon (LCOS) panel, a digital micro-mirror device (DMD), or a transmissive liquid crystal display (LCD). A light source may emit light to the light valve 740 so as to illuminate the light valve 740. When the light valve 740 is a LCOS panel, a polarizing beam splitter (PBS) may be disposed between the light valve 740 and the liquid crystal lens 110. When the light valve is a DMD, two liquid crystal lenses 110 respectively having two perpendicular rotation directions of liquid crystal molecules 116a may be adopted.

Figure 7:
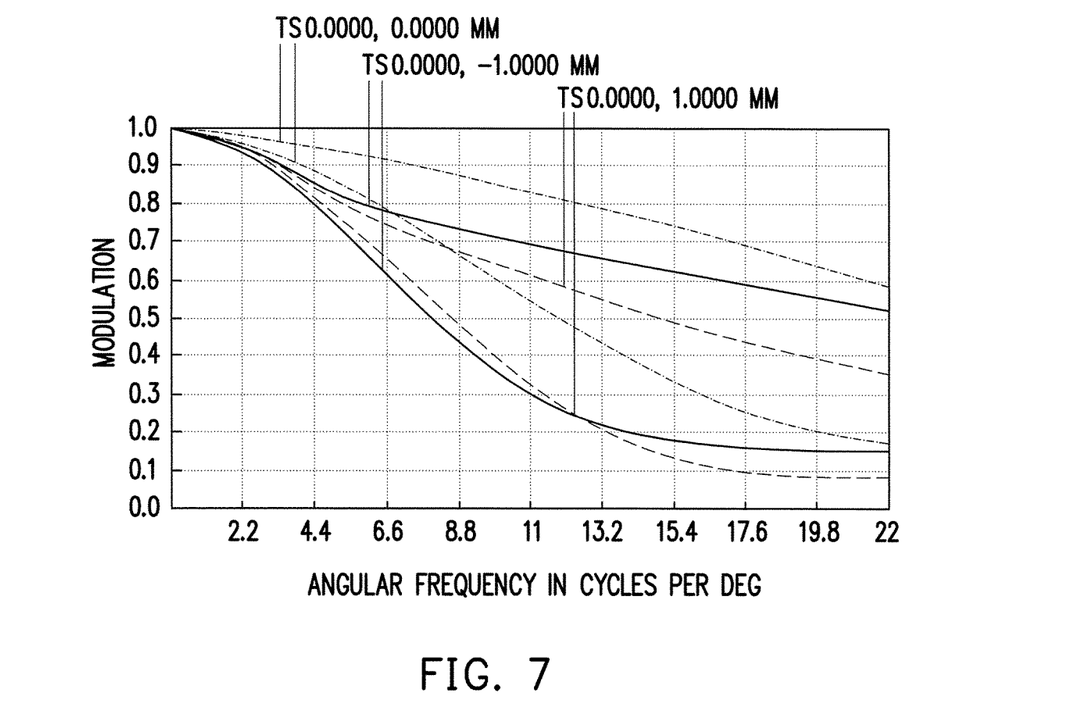
FIG. 7 is a modulation transfer function (MTF) diagram according to the embodiment depicted in FIG. 6.
Figure 8:
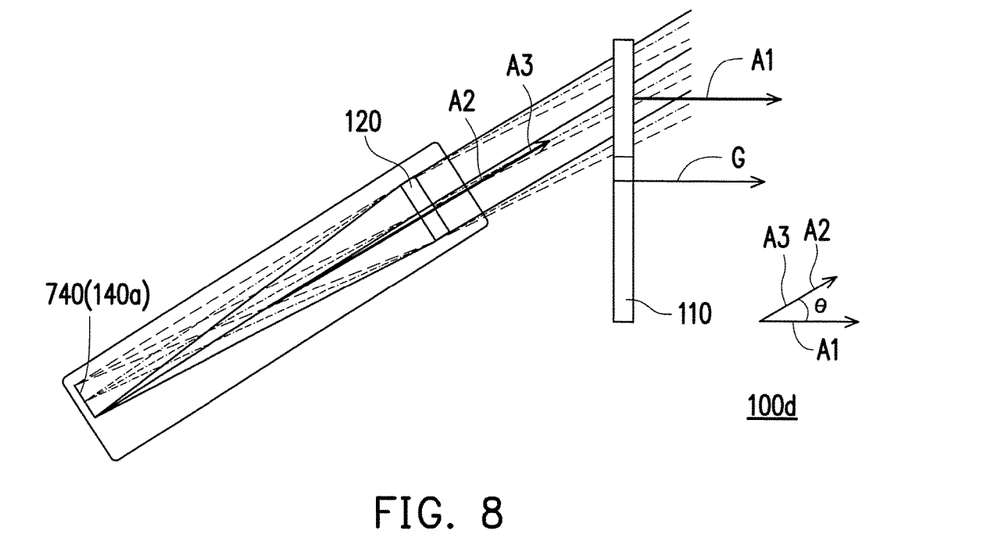
FIG. 8 is a schematic cross-sectional view of an optical system 100d according to another embodiment of the invention.
Figure 9:
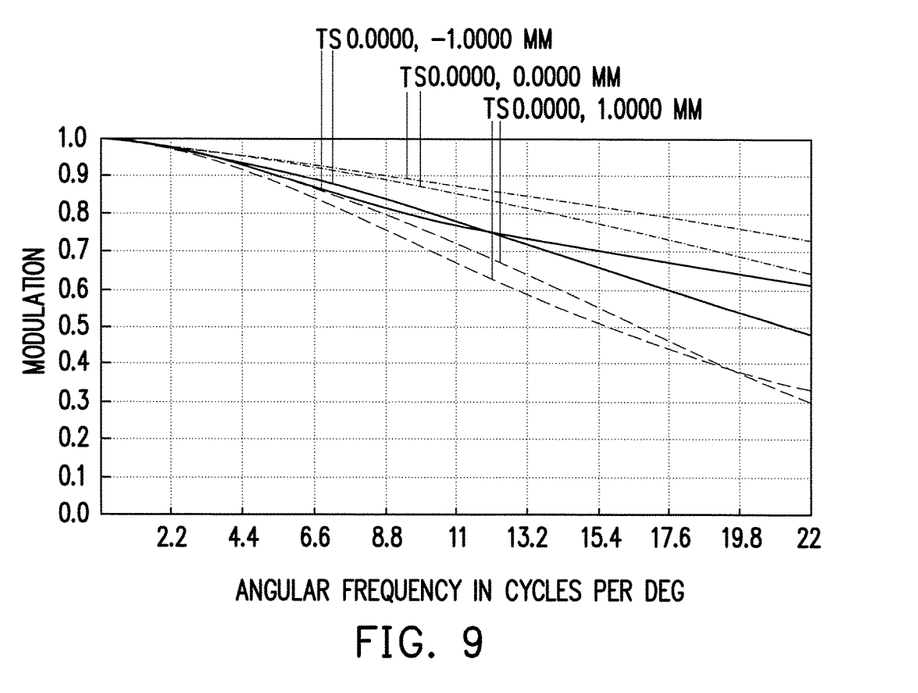
FIG. 9 is a MTF diagram according to the embodiment depicted in FIG. 8.

FIG. 7 is a modulation transfer function (MTF) diagram according to the embodiment depicted in FIG. 6. FIG. 8 is a schematic cross-sectional view of an optical system 100d according to another embodiment of the invention. FIG. 9 is a MTF diagram according to the embodiment depicted in FIG. 8. Referring to FIG. 6, FIG. 7, FIG. 8 and FIG. 9, as the optical axis A3 of the light valve 740 and the optical axis A2 of the imaging lens module 120 have an inclined angle θ with respect to the geometric axis G of the liquid crystal lens 110, as illustrated in FIG. 6, the optical axis A1 of the liquid crystal lens 110 does not shift away from the geometric axis G of the liquid crystal lens 110, but as illustrated in FIG. 8, the optical axis A1 of the liquid crystal lens 110 shifts upper away from the geometric axis G of the liquid crystal lens 110. As a result, the MTF diagram as illustrated in FIG. 9 show much better modulation performance in larger angular frequency in cycles per degree than the MTF diagram as illustrated in FIG. 7, wherein the larger modulation value is, the better quality of the image is. That is, the quality of the image 130a is improved due to the shift of the optical axis A1 of the liquid crystal lens 110.

Figure 10:
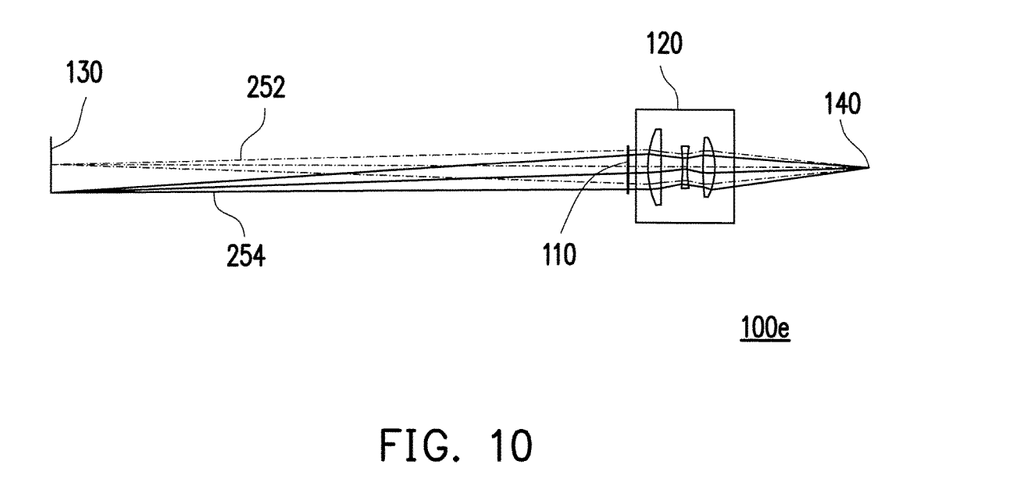
FIG. 10 is a schematic side view of an optical system 100e according to an embodiment of the invention.

FIG. 10 is a schematic side view of an optical system 100e according to an embodiment of the invention. Referring to FIG. 10, by change of distribution of orientations of the liquid crystal molecules 116a of the liquid crystal layer 116, an original light beam 252 can shift and form a light beam 254 having a displacement with the original light beam 252. Namely, the image 130a can shift up and down, left and right on the image plane 130 by change of distribution of orientations of the liquid crystal molecules 116a of the liquid crystal layer 116.

Figure 11:
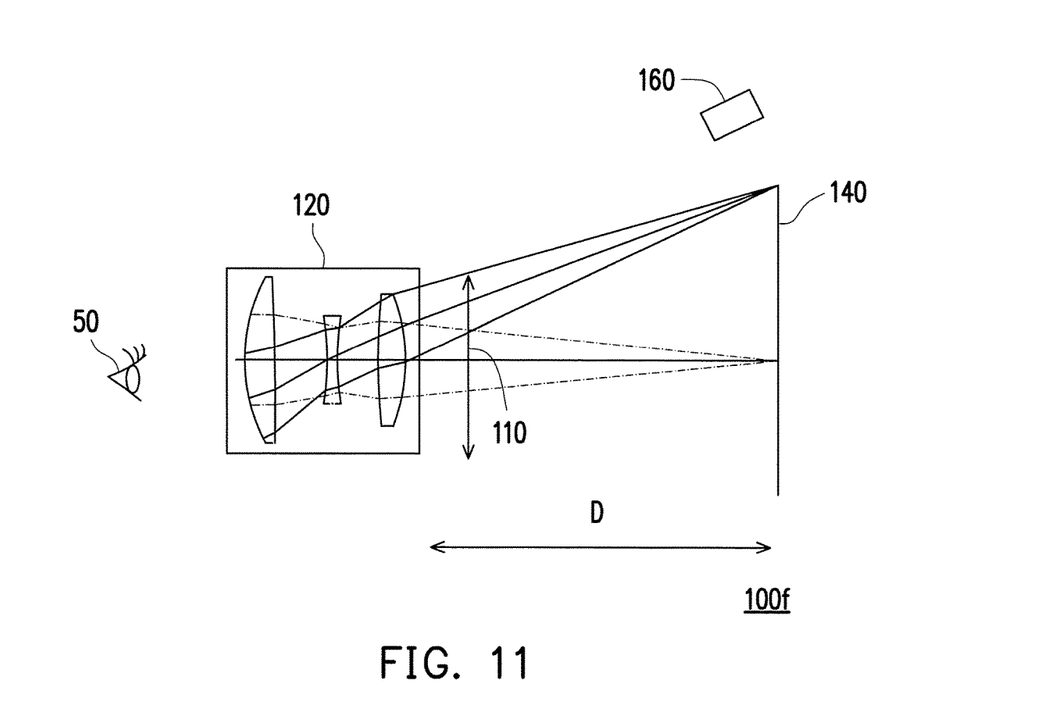
FIG. 11 and FIG. 12 are schematic side views of optical system 100f and 100g respectively according to other embodiments of the invention.
Figure 12:
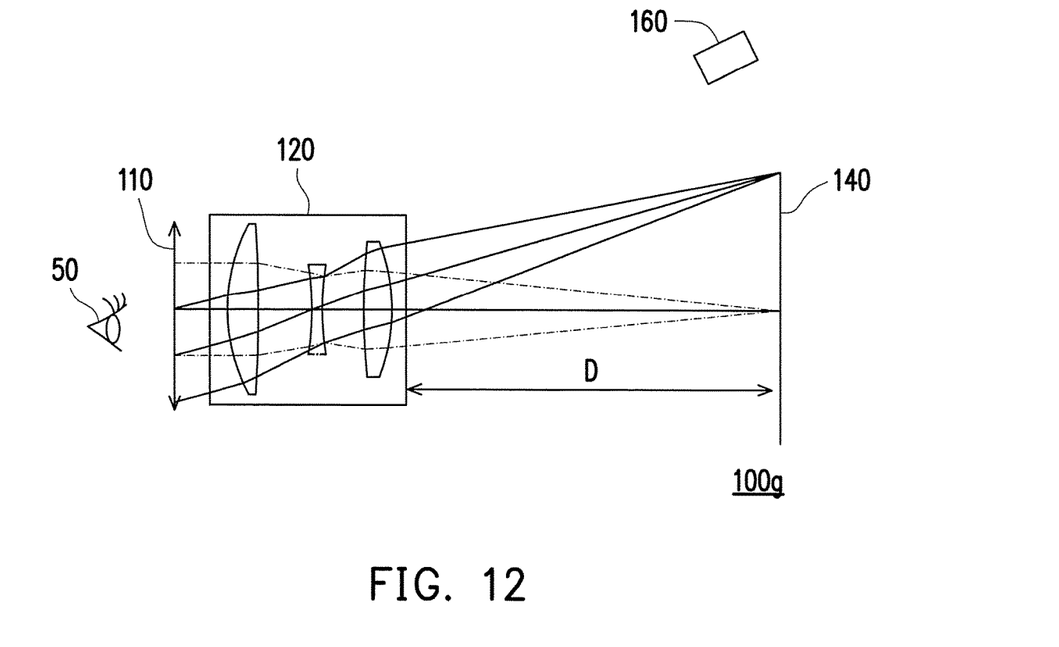

FIG. 11 and FIG. 12 are schematic side views of optical system 100f and 100g respectively according to other embodiments of the invention. Referring to FIG. 11 and FIG. 12, optical system 100f and 100g can further include an eye tracker 160 to detect a movement of an eyeball. In accordance with a direction of a sight of the eyeball, distribution of orientations of the liquid crystal molecules 116a of the liquid crystal layer 116 are changed to compensate the OPL of the light 150. For example, when a user looks at an upper side of the image 130a, the eye tracker 160 detects that the eyeballs of the user rotate up. Then the distribution of orientations of the liquid crystal molecules 116a of the liquid crystal layer 116 are changed and the optical axis A1 of the liquid crystal lens 110 shifts up to compensate the OPL of the light 150. Therefore, the quality of the upper side of the image seen by the user is improved. In the present embodiments, the liquid crystal lens 110 can be disposed between the object plane 140 and the imaging lens module 120 (as illustrated in FIG. 11), or the imaging lens module 120 is disposed between the object plane 140 and the liquid crystal lens 110 (as illustrated in FIG. 12). In addition, a distance D between the object plane 140 and the imaging lens module 120 is less than an effective focal length of the imaging lens module 120, and the image 130a is a virtual image.

Figure 13:
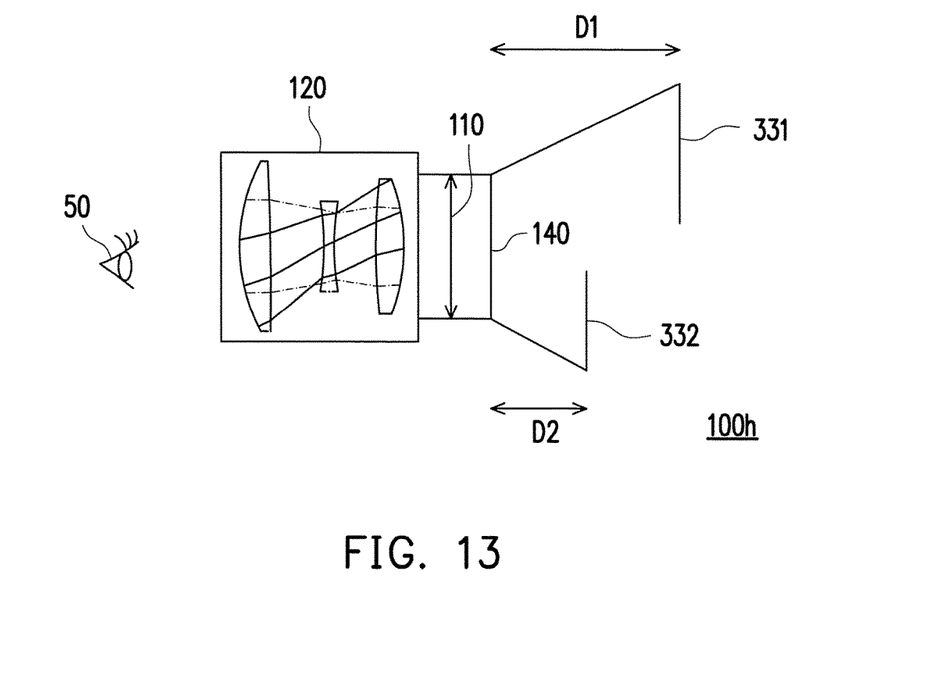
FIG. 13 is a schematic side view of an optical system 100h according to an embodiment of the invention.

FIG. 13 is a schematic side view of an optical system 100h according to an embodiment of the invention. Referring to FIG. 13, by changing the distribution of orientations of the liquid crystal molecules 116a of the liquid crystal layer 116, an upper portion and a lower portion of the liquid crystal lens 110 can have different refractive power, and distance D1 from the object plane 140 to an upper portion of the image plane 331 and distance D2 from the object plane 140 to a lower portion of the image plane 332 can be different.

Figure 14A:
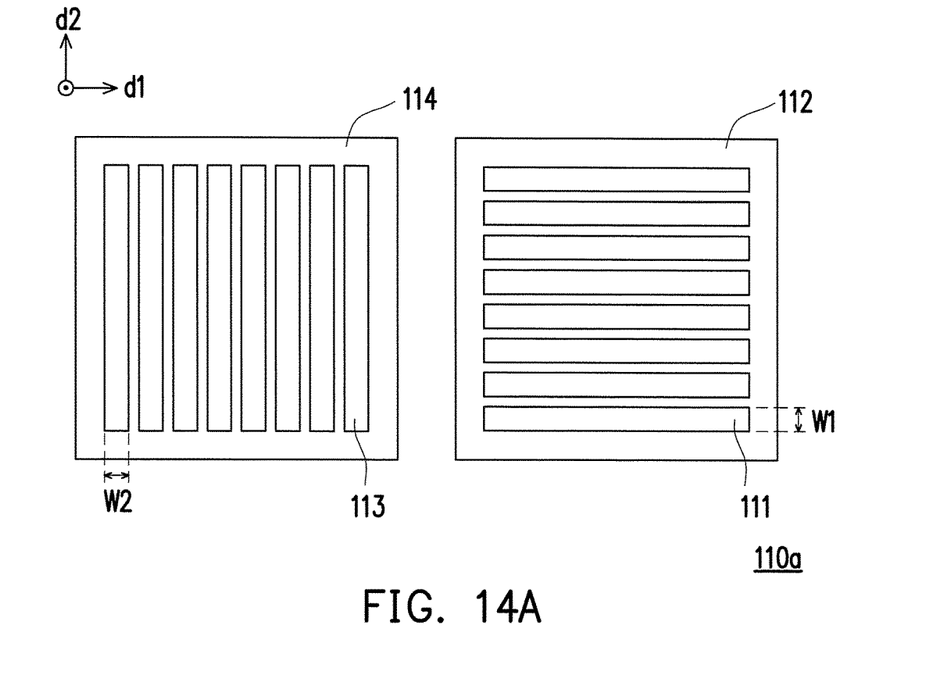
FIG. 14A is schematic top and bottom view of a liquid crystal lens 110a according to an embodiment of the invention.
Figure 14B:
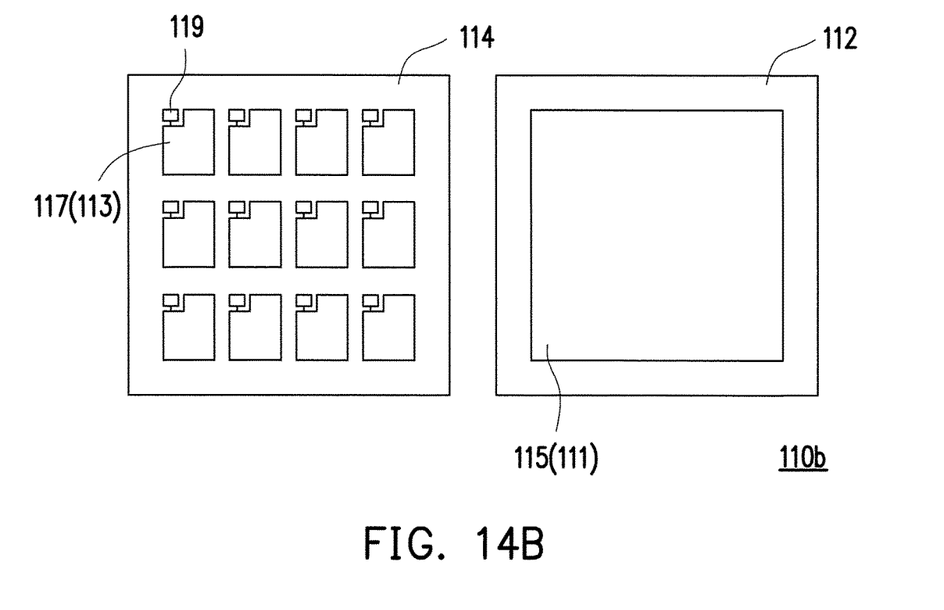
FIG. 14B is schematic top and bottom view of a liquid crystal lens 110b according to another embodiment of the invention.

FIG. 14A is schematic top and bottom view of a liquid crystal lens 110a according to an embodiment of the invention. FIG. 14B is schematic top and bottom view of a liquid crystal lens 110b according to another embodiment of the invention. In FIG. 14A and FIG. 14B, for clear description, only the first substrate 112, the second substrate 114, first electrodes 111, and second electrodes 113 are illustrated. Referring to FIG. 14A, the liquid crystal lens 110 includes a plurality of first electrodes 111 and a plurality of second electrodes 113. The plurality of first electrodes 111 are disposed on the first substrate 112 and arranged along a second direction d2. Each of the first electrodes 111 extends along a first direction d1. The plurality of second electrodes 113 are disposed on the second substrate 114 and arranged along the first direction d1. Each of the second electrodes 113 extends along the second direction d2. The first direction d1 is orthogonal to the second direction d2. Besides, width W1 of the plurality of first electrodes 111 can be different from width W2 of the plurality of second electrodes 113, so as to reduce the moire phenomenon. Referring to FIG. 14B, the liquid crystal lens 110 includes a common electrode 115 disposed on the first substrate 112, and a plurality of thin-film transistors (TFTs) 119 and pixel electrodes 117 respectively electrically connected to the TFTs 119 are disposed on the second substrate 114. In other embodiments, the common electrode 115 can be disposed on the second substrate 114, and the plurality of thin-film transistors (TFTs) 119 and pixel electrodes 117 respectively electrically connected to the TFTs 119 can be disposed on the first substrate 112, and the invention is not limited thereto.

Figure 15A:
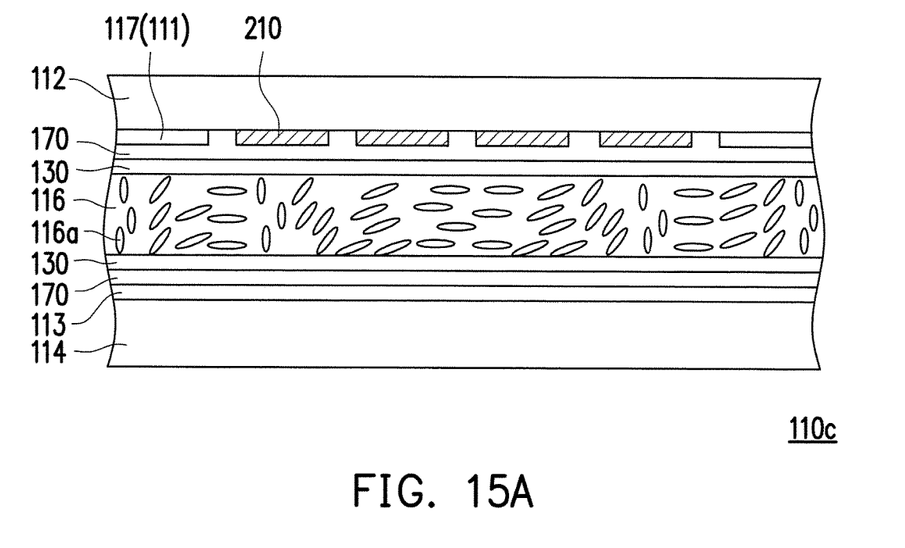
FIG. 15A is a schematic cross-sectional view of the liquid crystal lens 110c of an embodiment of the invention.

FIG. 15A is a schematic cross-sectional view of the liquid crystal lens 110c of an embodiment of the invention. Referring to FIG. 15A, the liquid crystal lens 110c further includes at least one floating electrode 210 disposed between two adjacent pixel electrodes 117 to control voltage distribution. The at least one floating electrode 210 can be disposed on at least one of the first substrate 112 and the second substrate 114. Namely, the at least one floating electrode 210 can be disposed on the first substrate 112, the second substrate 114, or both the first substrate 112 and the second substrate 114. (FIG. 15A illustrates that the floating electrodes 210 disposed on the first substrate 112)

Figure 15B:
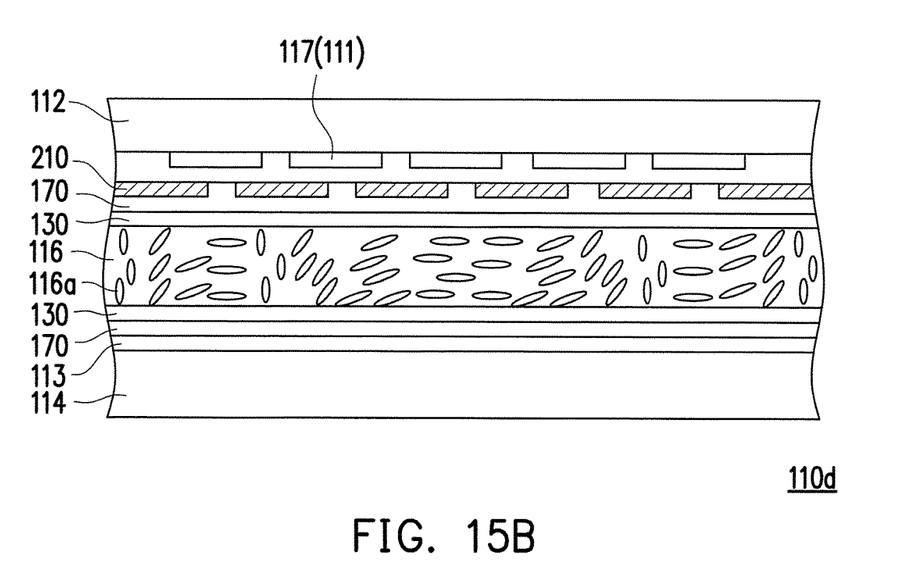
FIG. 15B and FIG. 15C are schematic cross-sectional views of the liquid crystal lens 110d and 110e respectively of others embodiments of the invention.
Figure 15C:
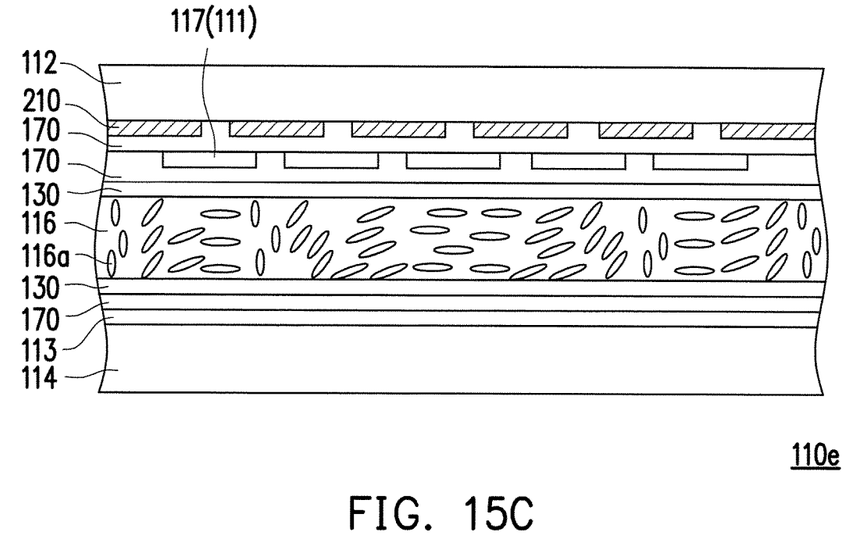

FIG. 15B and FIG. 15C are schematic cross-sectional views of the liquid crystal lens 110d and 110e respectively of others embodiments of the invention. Referring to FIG. 15B and FIG. 15C, the floating electrode 210 and the first electrode 111 can be disposed on different layers. For example, the floating electrodes 210 can be disposed between the plurality of first electrodes 111 and an alignment layer 130 as illustrated in the FIG. 15B. The floating electrode 210 can be disposed between the plurality of first electrode 111 and the first substrate 112 as illustrated in the FIG. 15C. In the present embodiments, the floating electrodes 210 are discrete respectively. The voltages of the floating electrodes 210 are related to the voltages of two adjacent pixel electrodes 117, and may be varied gradually from one adjacent pixel electrode 117 to another adjacent pixel electrode 117.

Figure 16:
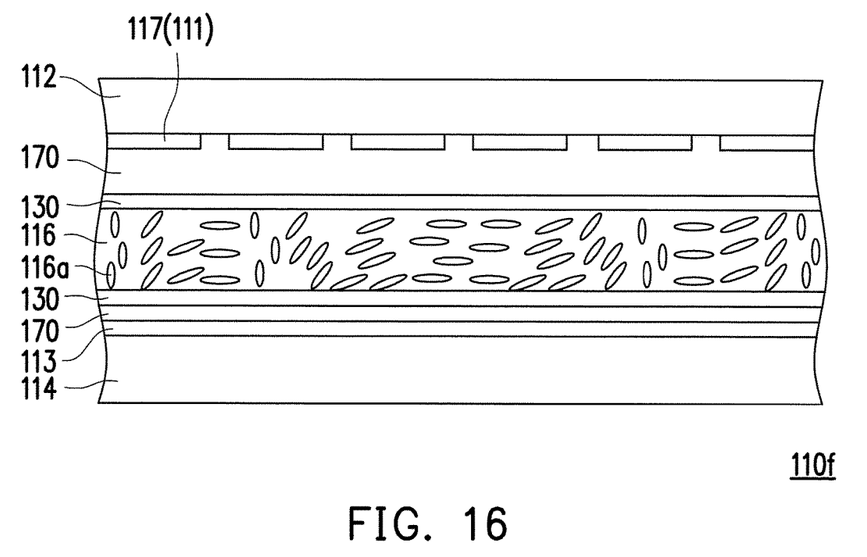
FIG. 16 is a schematic cross-sectional view of the liquid crystal lens 110f of an embodiment of the invention.

FIG. 16 is a schematic cross-sectional view of the liquid crystal lens 110f of an embodiment of the invention. Referring to FIG. 16, a thick insulating layer 170 can be added between the plurality of first electrodes 111 and the alignment layer 130 to make the voltage on the bottom surface of the thick insulating layer 170 vary continuously between the plurality of electrodes. Specially, the voltage distribution is not discrete but continuous, and the distribution of orientations of the liquid crystal molecules 116a of the liquid crystal layer 116 can vary continuously. As a result, the quality of the image can be improved. In this embodiment, the thickness of the thick insulating layer 170 ranges from 300 nm to 1000 nm. In other embodiments, the thick insulating layer 170 can be added between the plurality of second electrodes 113 and the alignment layer 130, or can be added respectively between the plurality of first electrodes 111 and the alignment layer 130 and between the plurality of second electrodes 113 and the alignment layer 130. The invention is not limited thereto.

Figure 17:
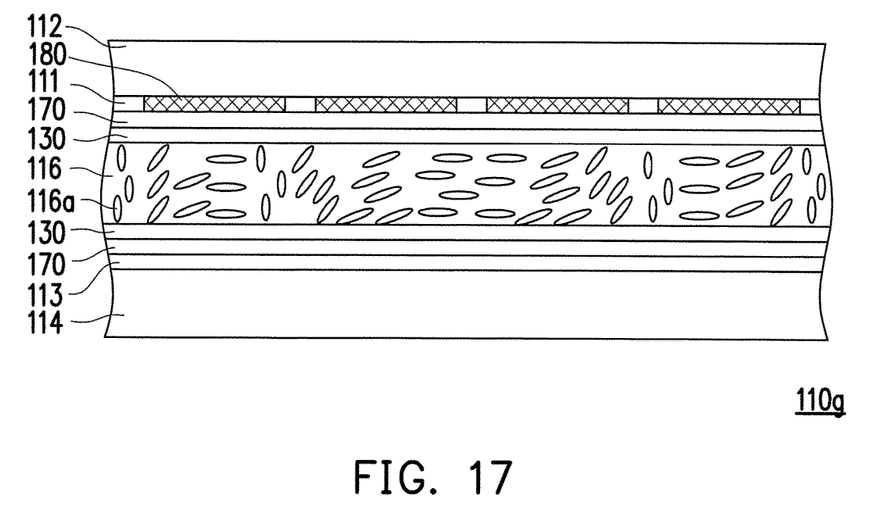
FIG. 17 is a schematic cross-sectional view of the liquid crystal lens 110g of an embodiment of the invention.

FIG. 17 is a schematic cross-sectional view of the liquid crystal lens 110g of an embodiment of the invention. Referring to FIG. 17, the plurality of first electrodes 111 are slender and a plurality of high impedance material layers 180 are disposed between two adjacent first electrodes 111 to make the voltage vary continuously between the plurality of the first electrodes 111. Therefore, the quality of the image can be improved. The sheet resistance of the high impedance material layers 180 ranges from $10^9$ to $10^{14}$ Ω/sq. The high impedance material layers 180 are made of semiconductor material including a III-V semiconductor compound or a II-VI semiconductor compound, or polymer material including PEDOT (poly(3,4-ethylenedioxythiophene)), for example. In other embodiments, the plurality of second electrodes 113 are slender and a plurality of high impedance material layers 180 are disposed between two adjacent second electrodes 113, or both the plurality of first electrodes 111 and the plurality of second electrodes 113 are slender and the plurality of high impedance material layers 180 are disposed respectively between two adjacent first electrodes 111 and two adjacent second electrodes 113. The invention is not limited thereto.

Figure 18:
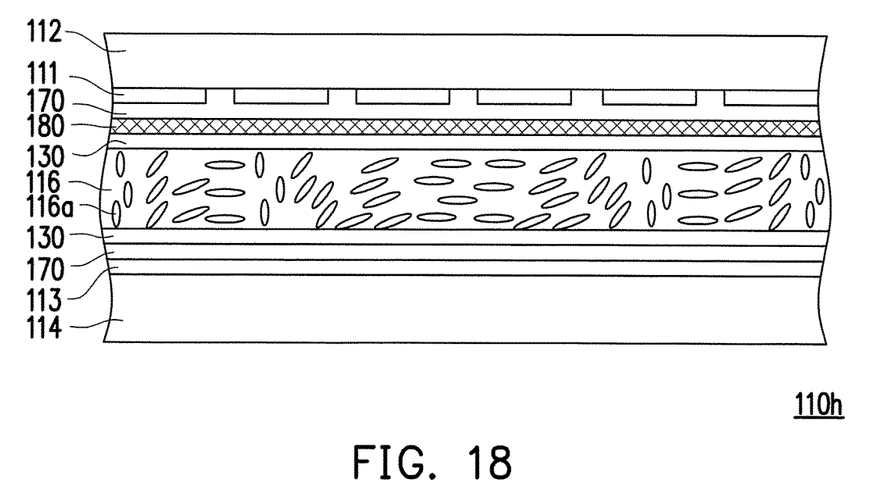
FIG. 18 is a schematic cross-sectional view of the liquid crystal lens 110h of an embodiment of the invention.

FIG. 18 is a schematic cross-sectional view of the liquid crystal lens 110h of an embodiment of the invention. Referring to FIG. 18, the high impedance material layer 180 can be added between the plurality of first electrodes 111 and the alignment layer 130 to make the voltage vary continuously between the plurality of first electrodes 111. Therefore, the quality of the image can be improved. In other embodiments, the high impedance material layer 180 can be added between the plurality of second electrodes 113 and the alignment layer 130, or can be added respectively between the plurality of first electrodes 111 and the alignment layer 130 and between the plurality of second electrodes 113 and the alignment layer 130. The invention is not limited thereto.

A sheet resistance of the high impedance material layer 180 is in the range from $10^9$ Ω/sq to $10^{14}$ Ω/sq.

In view of the foregoing, in the optical system provided by the embodiments of the invention, the optical system includes at least one liquid crystal lens, and the liquid crystal lens is driven by the voltage to change the distribution of orientations of the liquid crystal molecules, so as to make the effective refractive index of each position on the liquid crystal layer change and the optical axis of the liquid crystal lens shift away from a geometric axis of the liquid crystal lens. Therefore, the optical path difference of the image at wide viewing angle can be compensated, so as to reduce aberration. The quality of the image is improved. In addition, by controlling the distribution of orientations of the liquid crystal molecules, refractive power of the liquid crystal lens can be tunable, so as to achieve a zoom function.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. An optical system configured to form an image of an object, the optical system comprising:
   at least one liquid crystal lens disposed on a path of light from the object and comprising:
      a first substrate;
      a second substrate opposite to the first substrate; and
      a liquid crystal layer, disposed between the first substrate and the second substrate, wherein an effective refractive index of each position on the liquid crystal layer is related to an voltage applied, and the at least one liquid crystal lens is configured to change an optical axis of the at least one liquid crystal lens by changing distribution of orientations of liquid crystal molecules of the liquid crystal layer; and
   an imaging lens module disposed on the path of light from the object and comprising a plurality of lenses, the optical axis of the at least one liquid crystal lens does not overlap with an optical axis of the imaging lens module, wherein the at least one liquid crystal lens and the imaging lens module form the image of the object.

2. The optical system according to claim 1, wherein an optical axis of the imaging lens module is parallel to the optical axis of the at least one liquid crystal lens.

3. The optical system according to claim 1, wherein the object is on an object plane, the image is on an image plane, the image plane and the object plane are mutually conjugate planes, and imaging rays emitted from a same point on the object plane are all converged to a same point on the image plane.

4. The optical system according to claim 3, wherein the liquid crystal lens is disposed between the object plane and the imaging lens module, or between the image plane and the imaging lens module.

5. The optical system according to claim 1, wherein the plurality of lenses of the imaging lens module comprise a converging lens having positive refractive power and a diverging lens having negative refractive power.

6. The optical system according to claim 1, wherein the liquid crystal lens comprises a plurality of electrodes and at least one high impedance material layer to control voltage distribution, and the electrodes and the at least one high impedance material layer are disposed on at least one of the first substrate and the second substrate, wherein the voltage distribution varies continuously between the plurality of electrodes.

7. The optical system according to claim 6, wherein the liquid crystal lens further comprises an insulating layer disposed between the plurality of electrodes and the high impedance material layer.

8. The optical system according to claim 1, wherein the liquid crystal lens comprises a plurality of floating electrodes disposed on at least one of the first substrate and the second substrate to control voltage distribution.

9. The optical system according to claim 1, wherein the liquid crystal lens further comprises a plurality of first electrodes and a plurality of second electrodes, the plurality of first electrodes are disposed on the first substrate and arranged along a second direction, each of the first electrodes extends along a first direction, the plurality of second electrodes are disposed on the second substrate and arranged along the first direction, and each of the second electrodes extends along the second direction, wherein the first direction is orthogonal to the second direction.

10. The optical system according to claim 9, wherein width of the plurality of first electrodes is different from width of the plurality of second electrodes.

11. The optical system according to claim 1, wherein the liquid crystal lens further comprises a common electrode disposed on the first substrate, and a plurality of thin-film transistors (TFTs) and pixel electrodes respectively electrically connected to the TFTs disposed on the second substrate.

12. The optical system according to claim 1, wherein the liquid crystal lens is driven by the voltage to change the distribution of orientations of the liquid crystal molecules, so as to make refractive power of the liquid crystal lens tunable.

13. The optical system according to claim 1, wherein the liquid crystal lens is driven by the voltage to change the distribution of orientations of the liquid crystal molecules, so as to make the optical axis of the liquid crystal lens shift away from a geometric axis of the liquid crystal lens.

14. The optical system according to claim 13 further comprising a light valve, wherein the light valve is the object, and the light valve is formed by micro-structure pixel array.

15. The optical system according to claim 14, wherein an optical path difference of an imaging light beam of an upper portion or a lower portion of the light valve is compensated by a shift of the optical axis of the liquid crystal lens.

16. The optical system according to claim 14, wherein an optical axis of the light valve and the optical axis of the imaging lens module have an inclined angle with respect to the geometric axis of the liquid crystal lens, wherein the inclined angle is greater than 0 degree and is less than or equal to 60 degrees.

17. The optical system according to claim 13, wherein the image shifts up and down, left and right on an image plane by change of distribution of orientations of the liquid crystal molecules of the liquid crystal layer.

18. The optical system according to claim 1, wherein the object is on an object plane, the liquid crystal lens is disposed between the object plane and the imaging lens module, and a distance between the object plane and the imaging lens module is less than an effective focal length of the imaging lens module.

19. The optical system according to claim 1, wherein the object is on an object plane, the imaging lens module is disposed between the object plane and the liquid crystal lens, and a distance between the object plane and the imaging lens module is less than an effective focal length of the imaging lens module.

20. The optical system according to claim 1, wherein the object is on an object plane, the image is on an image plane, an upper portion and a lower portion of the liquid crystal lens have different refractive power, and distance from the object plane to an upper portion of the image plane and distance from the object plane to a lower portion of the image plane are different.

* * * * *